(12) United States Patent
Derscheid et al.

(10) Patent No.: US 12,694,698 B2
(45) Date of Patent: Jul. 28, 2026

(54) BALE IDENTIFICATION USING NET WRAP CHARACTERISTIC

(71) Applicant: DEERE & COMPANY, Moline, IL (US)

(72) Inventors: Daniel E. Derscheid, Ottumwa, IA (US); Georg A. Kormann, Zweibruecken (DE)

(73) Assignee: DEERE & COMPANY, Moline, IL (US)

( * ) Notice: Subject to any disclaimer, the term of this patent is extended or adjusted under 35 U.S.C. 154(b) by 354 days.

(21) Appl. No.: 18/432,832

(22) Filed: Feb. 5, 2024

(65) Prior Publication Data

US 2025/0252763 A1 Aug. 7, 2025

(51) Int. Cl.

| | |
|---|---|
| ***G06V 20/80*** | (2022.01) |
| ***A01F 15/07*** | (2006.01) |
| ***G06V 10/75*** | (2022.01) |

(52) U.S. Cl.

CPC .......... *G06V 20/80* (2022.01); *A01F 15/0715* (2013.01); *G06V 10/751* (2022.01); *A01F 2015/0745* (2013.01); *A01F 2015/076* (2013.01)

(58) Field of Classification Search

CPC ...... G06V 20/80; G06V 10/751; G06V 10/17; G06V 10/443; G06V 10/54; G06V 10/74; G06V 20/64; G06V 10/764; A01F 15/0715; A01F 2015/0745; A01F 2015/076

See application file for complete search history.

(56) References Cited

U.S. PATENT DOCUMENTS

| | | | |
|---|---|---|---|
| 5,546,475 | A | 8/1996 | Bolle et al. |
| 5,664,306 | A | 9/1997 | Sa don et al. |
| 6,360,179 | B1 | 3/2002 | Reep |
| 6,966,162 | B2 | 11/2005 | Viaud et al. |
| 10,517,221 | B2 | 12/2019 | Thoreson et al. |
| 10,926,908 | B2 | 2/2021 | Schlichting |

(Continued)

FOREIGN PATENT DOCUMENTS

| | | | |
|---|---|---|---|
| AT | 3610 | U1 | 6/2000 |
| EP | 3228180 | A1 | 10/2017 |

(Continued)

OTHER PUBLICATIONS

Extended European Search Report and Written Opinion issued in European Patent Application No. 21187736.0, dated Dec. 17, 2021, in 07 pages.

(Continued)

*Primary Examiner* — Bobbak Safaipour

(57) ABSTRACT

A bale identification system includes an initial image sensor that is operable to capture an initial image of an initial bale bound with a wrap material. A computing device analyzes the initial image to identify a unique wrap characteristic on the wrap material of the initial bale in the initial image. The computing device may then associate the unique wrap characteristic with the initial bale and save the initial image and the associated unique wrap characteristic in a memory, such that the identified unique wrap characteristic of the initial bale is used as an identifier of the initial bale. The unique wrap characteristic may include a random two-dimensional and/or three-dimensional splotch pattern formed onto a surface of the wrap material.

11 Claims, 3 Drawing Sheets

(56) References Cited

U.S. PATENT DOCUMENTS

| | | | |
|---|---|---|---|
| 11,587,313 B2 | 2/2023 | Kraus | |
| 2007/0021018 A1 | 1/2007 | Lin et al. | |
| 2007/0175341 A1 | 8/2007 | Roberts | |
| 2011/0214393 A1 | 9/2011 | Kuhns | |
| 2012/0048129 A1 | 3/2012 | Smith et al. | |
| 2012/0266763 A1 | 10/2012 | Foster et al. | |
| 2012/0319837 A1 | 12/2012 | Foster et al. | |
| 2014/0125501 A1 | 5/2014 | Baade | |
| 2015/0245563 A1 | 9/2015 | Heaney et al. | |
| 2015/0354943 A1 | 12/2015 | Posselius et al. | |
| 2017/0287303 A1 | 10/2017 | Lang et al. | |
| 2018/0021796 A1 | 1/2018 | Roberts et al. | |
| 2018/0082611 A1 | 3/2018 | Mcleod et al. | |
| 2018/0249635 A1* | 9/2018 | Kraus | A01F 15/0875 |
| 2018/0249636 A1* | 9/2018 | Kraus | A01F 15/0715 |
| 2018/0249637 A1* | 9/2018 | Kraus | B65B 11/025 |
| 2018/0260674 A1 | 9/2018 | Hamilton et al. | |
| 2019/0289769 A1 | 9/2019 | Antich | |
| 2019/0302772 A1 | 10/2019 | Anderson et al. | |
| 2020/0015401 A1 | 1/2020 | Frei et al. | |
| 2020/0020093 A1 | 1/2020 | Frei et al. | |
| 2021/0112725 A1 | 4/2021 | Bozarth et al. | |
| 2021/0116361 A1 | 4/2021 | Olander et al. | |
| 2021/0164921 A1 | 6/2021 | Lenzini et al. | |
| 2021/0240965 A1 | 8/2021 | Yadav et al. | |
| 2022/0051015 A1* | 2/2022 | Kraus | G06V 10/751 |
| 2022/0067371 A1* | 3/2022 | Kraus | G06V 10/225 |

FOREIGN PATENT DOCUMENTS

| | | |
|---|---|---|
| EP | 3961576 A1 | 3/2022 |
| WO | WO 2006027637 A1 | 3/2006 |
| WO | WO 2019123039 A1 | 6/2019 |

OTHER PUBLICATIONS

Extended European Search Report and Written Opinion issued in European Patent Application No. 21192690.2, dated Jan. 26, in 11 pages.

Extended European Search Report and Written Opinion issued in European Patent Application No. 25153991.2 dated Jul. 1, 2025, in 09 pages.

* cited by examiner

BALE IDENTIFICATION USING NET WRAP CHARACTERISTIC

TECHNICAL FIELD

The disclosure generally relates to a system for identifying and tracking a bale of material.

BACKGROUND

Many different materials may be formed into a bale for transportation and/or storage. The material may include, but is not limited to, forage material such as hay, alfalfa, corn stalks, etc.; cotton; paper; etc. The bales may be formed to include, but are not limited to, a parallelepiped shape or a cylindrical shape. Bales having a parallelepiped shape are generally formed by compressing the material into a flake within a rectangular compression chamber, and then bundling multiple flakes together to form the bale. Bales having a cylindrical shape are generally formed by continuously feeding the crop material into a cylindrical forming chamber and rolling the crop material in a spiral fashion into the bale having the cylindrical shape.

The material forming each respective bale may have different and unique characteristics that an operator may wish to track and/or monitor. For example, each bale may have a respective weight, moisture content, ash content, variety of material content, weed content, nutritional content, etc. In some operations, it is useful for the operator to be able to track and identify the characteristics for each individual bale. By doing so, for example, the operator may separate bales of higher quality from bales of lower quality, and sell/use them accordingly.

Previously, it is known to attach an RFID tag to each bale, and assign the RFID tag a specific identification number. Specific characteristics of the bale with then be associated with the specific identification number. The RFID tag may be read/scanned to identify the identification number, and then the associated characteristics of that bale may be retrieved.

In other previous baler systems, it is known to use an image to identify random unique colored band patterns in a baler twine for identifying particular bales. See U.S. Pat. No. 11,587,313 for example. However, due to the extremely narrow width of a strand of twine, the possible random identifiable variations in the color bands are limited, thereby limiting the number of individual bales that may be identified via this system.

SUMMARY

A bale identification system is provided. The bale identification system includes an initial image sensor that is operable to capture an initial image of an initial bale bound with a wrap material. A computing device is disposed in communication with the initial image sensor. The computing device is operable to receive the initial image from the initial image sensor. The computing device includes a processor and a memory having a bale identification algorithm stored thereon. The processor is operable to execute the bale identification algorithm to analyze the initial image to identify a unique wrap characteristic on the wrap material of the initial bale in the initial image. The computing device may then associate the unique wrap characteristic identified from the wrap material with the initial bale and save the initial image and the associated unique wrap characteristic in the memory of the computing device, such that the identified unique wrap characteristic of the initial bale is used as an identifier of the initial bale. A second image sensor is operable to capture a second image of a second bale. The second image sensor is disposed in communication with the computing device for communicating the second image to the computing device. The computing device may then compare the second image of the second bale to the unique wrap characteristic identified in the initial image of the initial bale to determine if the second image of the second bale includes the unique wrap characteristic identified in the initial image. When the computing device identifies the unique wrap characteristic of the initial bale in the second image of the second bale, the computing device may then determine that the second bale from the second image is the initial bale from the initial image.

In one aspect of the disclosure, the unique wrap characteristic includes a random splotch pattern. In one implementation, the random splotch pattern includes a two-dimensional pattern. In another implementation, the random splotch pattern may include a three-dimensional pattern, i.e., a two-dimensional shape further including texture and/or depth in a third dimension.

In one aspect of the disclosure, the random splotch pattern may include a randomly created pattern applied onto the wrap material. The randomly created pattern may be applied onto the wrap material during manufacture of the wrap material, or during application of the wrap material onto the initial bale by a baler implement. For example, the baler implement may include a marking applicator that is operable to apply a marking material onto the wrap material to form the random splotch pattern on the wrap material, whereby the random splotch pattern defines the unique wrap characteristic. In one implementation, the marking applicator may be operable to apply the marking material onto the wrap material to form the three-dimensional splotch pattern.

In one aspect of the disclosure, the wrap material includes one of a solid wrap material or a net wrap material. Because the wrap material, i.e., the solid wrap material or the net wrap material, spans the entire width of the bale, the area onto which the random splotch pattern may be applied and/or formed to create the wrap characteristic is considerably greater than the width of twine or strapping, thereby increasing the potential random identifiable variations in the random splotch pattern when compared to random color schemes on twine or strapping. This increases the number of bales that may be tracked using the bale identification system when compared to prior art systems that use a color coded twine or strapping to identify bales. Additionally, because the random splotch pattern may be applied onto a large surface of the wrap material, as opposed to a very narrow strand of twine or strapping, the random splotch pattern may be formed to include three-dimensional shapes, which further increase the possible random variations that may be used to identify bales.

In one aspect of the disclosure, the processor is operable to execute the bale identification algorithm to associate data related to the initial bale with the identified unique wrap characteristic of the initial bale. In one aspect of the disclosure, the second image sensor may include, but is not limited to, a handheld device.

In one aspect of the disclosure, the bale identification system may include an output disposed in communication with the computing device and operable to receive a signal from the computing device. In one implementation, the output may be incorporated into the and/ow with the second image sensor and configured as a handheld device. The processor is operable to execute the bale identification algorithm to communicate data related to the initial bale associated with the unique wrap characteristic to the output when the unique wrap characteristic is identified in the second image of the second bale.

In one aspect of the disclosure, the bale identification system may be part of and/or incorporated into a baling system for baling crop material. The baling system may include, but is not limited to, a baler implement including a bale formation system for forming collected crop material into the initial bale, a wrap system operable to wrap the initial bale with the wrap material, and the initial image sensor positioned to capture the initial image of a region of the initial bale.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
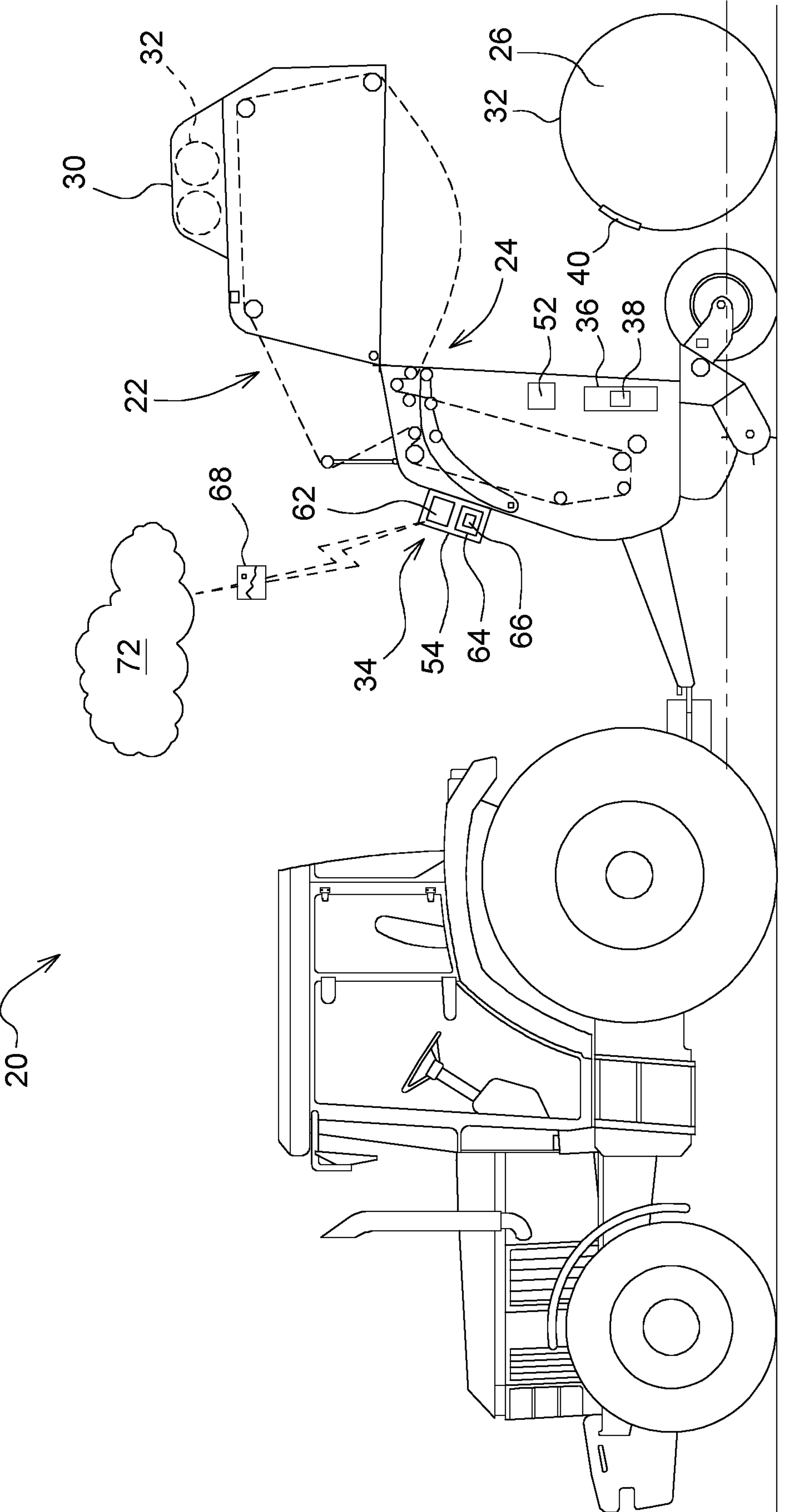
FIG. 1 is a schematic side view of a baling system.

Referring to the Figures, wherein like numerals indicate like parts throughout the several views, a baling system for baling crop material is generally shown at 20. The baling system 20 includes a baler implement 22. Referring to FIG. 1, the baler implement 22 forms crop material into a bale 26, 28. The example implementation of the baler implement 22 is shown as a round baler that forms the crop material into a bale 26, 28 having a cylindrical shape. However, it should be appreciated that the teachings of this disclosure may be applied to other types and/or configurations of baler implement 22, such as but not limited to, a square baler that forms the crop material into a bale having a parallelepiped shape.

The baler implement 22 includes a pick-up that gathers the crop material and a feeder system that feeds the crop material into a compression or baling chamber. The baler implement 22 includes a bale formation system 24 for forming collected crop material into the bale 26, 28, for example, an initial bale 26 and/or a second bale 28 as described in greater detail below. The specific features, components, and operation of the bale formation system 24 are dependent upon the type of baler implement 22. For example, if the baler implement 22 is configured as a round baler, such as the example implementation shown in the figures and described herein, then the bale formation system 24 may be configured as a variable chamber baler, or as a fixed chamber baler. When configured as a variable chamber baler the bale formation system 24 includes a plurality of longitudinally extending side-by-side forming belts that are supported by a plurality of rollers. The bale 26, 28 is formed by the forming belts and one or more side walls of a housing. The crop material is directed through an inlet and into a baling chamber, whereby the forming belts roll the crop material in a spiral fashion into the bale 26, 28 to form a cylindrical shape. The belts apply a constant pressure to the crop material as the crop material is formed into the bale 26, 28. A belt tensioner continuously moves the forming belts radially outward relative to a center of the cylindrical bale 26, 28 as the diameter of the bale 26, 28 increases. The belt tensioner maintains the appropriate tension in the belts to obtain the desired density of the crop material. When configured as a fixed chamber baler, the bale formation system 24 includes a plurality of rollers fixed in position to define a circular forming chamber. The crop material is directed through an inlet and into the forming chamber, whereby at least one of the rollers rotates to rotate the crop material in a spiral fashion, thereby forming the bale 26, 28 into the cylindrical shape. The general features and operation of the bale formation system 24 of the variable chamber round baler and the fixed chamber round baler are understood by those skilled in the art, are not pertinent to the teachings of this disclosure, and are therefore not described in greater detail herein.

The baler implement 22 further includes a wrap system 30. The wrap system 30 is operable to wrap the bale 26, 28 of crop material with a wrap material 32. The specific features, components, and operation of the wrap system 30 are understood by those skilled in the art, are not pertinent to the teachings of this disclosure, and are therefore not described in greater detail herein.

The wrap material 32 may include, for example, a solid wrap material 32 or a net wrap material 32. The wrap material 32 spans across a width or height of the bale 26, 28, and around a circumference of the bale 26, 28. For example, when the bale 26, 28 is formed to define a cylindrical shape, the wrap material 32 is wrapped around the cylindrical circumferential surface, between circular end faces of the cylindrical shape. The wrap material 32, either the solid wrap and/or the net wrap, may be manufactured from a natural material or a synthetic material, e.g., a plastic material. It should be appreciated that wrap material 32 described herein does not include a twine strand or a banding strap. However, it should be appreciated that the wrap material 32 as described herein may be placed under or over one or more twine strands and/or banding straps. Additionally, the wrap material 32 may be applied to the bale 26, 28 as part of a process executed by the baler implement 22, or by another machine form positioned to receive the bale 26, 28 from the baler implement 22, such as for example, a bale 26, 28 wrapper positioned immediately behind the baler implement 22.

The baler implement 22 may further include a bale identification system 34. The bale identification system 34 provides features and components that enable a method of identifying and tracking each respective bale 26, 28 and information related to each respective bale 26, 28. The bale identification system 34 may include, as an example, a marking applicator 36 coupled to the baler implement 22. The marking applicator 36 may be configured to apply a marking material 38 onto the wrap material 32. The marking applicator 36 may apply the marking material 38 onto the wrap material 32 of the bale 26, 28 to delineate a region 40 of the bale 26, 28 and/or to form a unique wrap characteristic 42 on the wrap material 32 of the bale 26, 28. The region 40 of the bale 26, 28 delineated by the marking material 38 may designate or define a reference area of the bale 26, 28, from which the unique wrap characteristic 42 may be identified. In the example implementation described herein, the marking material 38 may include, but is not limited to, an ink or paint system that is operable to apply, spray or otherwise transfer ink, paint, or other similar material onto the wrap material 32 of the bale 26, 28 to form or define the region 40 within which the unique wrap characteristic 42 may be sensed. In one example implementation, the region 40 may include and/or define a closed geometric shape, e.g., a box, rectangle, circle, etc.

Figure 2:
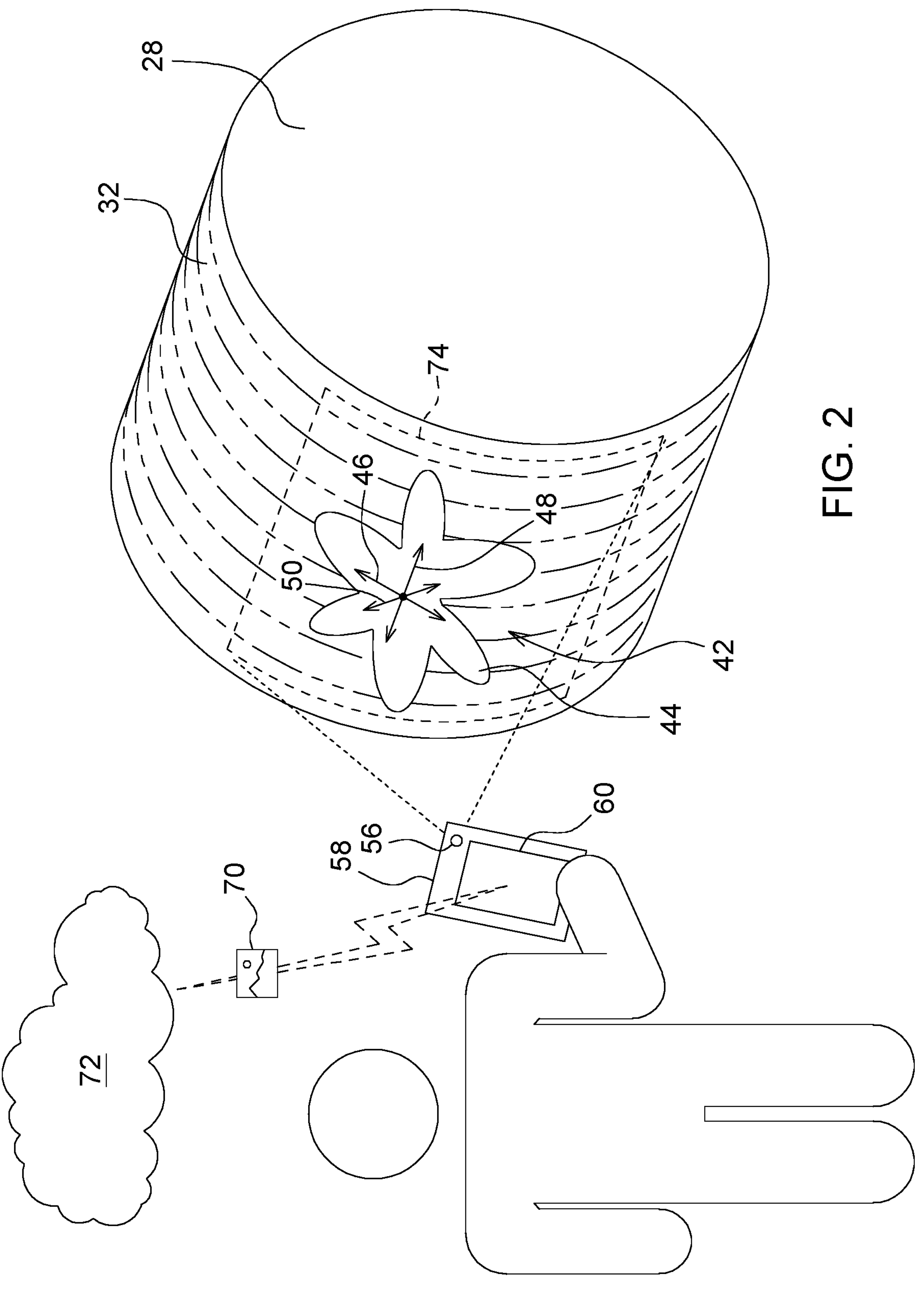
FIG. 2 is a schematic perspective view showing a user identifying a bale.

Referring to FIG. 2, the marking applicator 36 may further be configured to apply the marking material 38 onto the wrap material 32 of the bale 26, 28 to form the unique wrap characteristic 42. In other implementations, the unique wrap characteristic 42 may include a naturally occurring feature or characteristic of the wrap material 32, or may include a feature or characteristic added to the wrap material 32 during manufacture but prior to application of the wrap material 32 onto the bale 26, 28. In one example implementation, the unique wrap characteristic 42 may include, but is not limited to, a random splotch pattern 44 on the wrap material 32. As used herein, the term “splotch” is defined as a large, irregular, or uneven spot, stain, or colored area. The random splotch pattern 44 may be a naturally occurring pattern on the wrap material 32, a randomly created pattern on and/or integral with the wrap material 32, or a randomly created pattern positioned on an applique applied to the wrap material 32. While the unique wrap characteristic 42 is described herein as including the random splotch pattern 44, it should be appreciated that the unique wrap characteristic 42 may include some other feature/pattern of the wrap material 32 that is unique to an associated bale 26, 28. For example, the marking applicator 36 may be configured to apply the marking material 38 in a random manner such that no two splotch patterns 44 are identical. For example, the marking applicator 36 may include a fan or other dispersion or application mechanism that randomly disperses the marking material 38. In other words, the marking applicator 36 is not configured to apply marking material 38 in a fixed or controlled pattern, but is instead configured to apply the marking material 38 in a random pattern.

In one implementation, the random splotch pattern 44 may include a substantially two-dimensional pattern on the wrap material 32. The two-dimensional pattern may be applied, for example, onto the circumferential surface of the wrap material 32. As such, the two-dimensional pattern may include a height dimension 46 and a width dimension 48 on the surface of the wrap material 32. Preferably, the height dimension 46 and the width dimension 48 are at least equal to or greater than one hundred millimeters (100 mm). In other implementations, it is contemplated that the random splotch pattern 44 may include a three-dimensional pattern. The three-dimensional pattern may include the height dimension 46 and the width dimension 48 on the surface of the wrap material 32, and further include a depth dimension 50 extending outward away from the surface of the wrap material 32. The depth dimension 50 may be random, forming a texture of the random splotch pattern 44. The depth dimension 50 may include a depth that is large enough to be detected and/or identified by a sensor as described in greater detail below, for example, equal to or greater than approximately one millimeter (1 mm).

In another implementation, the random splotch pattern 44 may include a randomly created pattern formed during manufacture of the wrap material 32. As such, the random splotch pattern 44 may not be applied by the marking applicator 36 of the baler implement 22, but may instead be manufactured into the wrap material 32. The random splotch pattern 44, or other unique wrap characteristic 42 such as but not limited to a texture of the wrap material 32, may be formed into the wrap material 32 during a manufacturing process. For example, the wrap material 32 may be formed using random patterns and combinations of differently colored filaments wound or weaved together to form the wrap material 32.

While the unique wrap characteristic 42 is described above including the unique splotch pattern 44, it should be appreciated that the unique wrap characteristic 42 may include some other feature and/or property of the wrap material 32. For example, the unique wrap characteristic 42 may include a specific pattern of net wrap material 32, a texture of the surface of the wrap material 32, wrinkles formed in the wrap material 32, etc.

The initial image sensor 52 may be positioned on the baler implement 22 to capture the initial image 68 of the region 40 of the initial bale 26. The initial image sensor 52 is disposed in communication with a computing device 54 (described in greater detail below) for communicating the initial image 68 of the bale 26, 28 to the computing device 54. The initial image sensor 52 is operable to capture the initial image 68 of the initial bale 26 upon completion of formation of the initial bale 26, or immediately thereafter. In other words, the initial image sensor 52 may capture the initial image 68 of the bale 26, 28 at or near the baler implement 22 as formation of the initial bale 26 is completed and/or discharged onto the ground. The initial image sensor 52 may include, for example, a camera or other image sensing device capable of sensing an image of the region 40 of the bale 26, 28. The specific type, configuration, and operation of the initial image sensor 52 are understood by those skilled in the art, are not pertinent to the teachings of the disclosure, and are therefore not described in detail herein.

Referring to FIG. 2, the bale identification system 34 may further include a second image sensor 56 that is operable to capture a second image 70 of a bale 26, 28, e.g., the second bale 28. The second image sensor 56 is disposed in communication with the computing device 54 for communicating the second image 70 to the computing device 54. The second image sensor 56 may include, for example, a camera or other image sensing device capable of sensing an image of the second region 74 of the second bale 28. In one implementation, the second image sensor 56 may include a camera of a handheld device 58, such as but not limited to a smart phone or tablet. The second image sensor 56 may be located remotely from the initial image sensor 52. As noted above, the second image sensor 56 may be incorporated into a handheld device 58. In other implementations, the second image sensor 56 may be mounted onto a second vehicle, remote from the baler implement 22.

The bale identification system 34 may further include an output 60. The output 60 is disposed in communication with the computing device 54 and operable to receive a signal from the computing device 54. The output 60 may include any device that is capable of communicating information or a message to an operator. For example, the output 60 may include a visual display and/or an audio speaker. In one implementation, the output 60 is a handheld device 58, such as but not limited to a smart phone or tablet. In one implementation, the second image sensor 56 and the output 60 are combined as a single device. In other implementations, the output 60 may be mounted onto a vehicle, remote from the baler implement 22.

As described above, the bale identification system 34 includes the computing device 54. The computing device 54 is disposed in communication with the initial image sensor 52, the second image sensor 56, and the output 60. The computing device 54 is operable to receive image signals from the initial image sensor 52, receive image signals from the second image sensor 56, and communicate a signal to the output 60. While the computing device 54 is generally described herein as a singular device, it should be appreciated that the computing device 54 may include multiple devices linked together to share and/or communicate information therebetween. Furthermore, it should be appreciated that the computing device 54 may be located on the baler implement 22 or located remotely from the baler implement 22.

The computing device 54 may alternatively be referred to as a computer, a controller, a control unit, a control module, a module, etc. The computing device 54 includes a processor 62, a memory 64, and all software, hardware, algorithms, connections, sensors, etc., necessary to manage and control the operation of the initial image sensor 52, the second image sensor 56, and the output 60. As such, a method may be embodied as a program or algorithm operable on the computing device 54. It should be appreciated that the computing device 54 may include any device capable of analyzing data from various sensors, comparing data, making decisions, and executing the required tasks.

As used herein, "computing device 54" is intended to be used consistent with how the term is used by a person of skill in the art, and refers to a computing component with processing, memory, and communication capabilities, which is utilized to execute instructions (i.e., stored on the memory 64 or received via the communication capabilities) to control or communicate with one or more other components. In certain embodiments, the computing device 54 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The computing device 54 may be in communication with other components on the baler implement 22, such as hydraulic components, electrical components, and operator inputs within an operator station of an associated work vehicle. The computing device 54 may be electrically connected to these other components wirelessly or by a wiring harness such that messages, commands, and electrical power may be transmitted between the computing device 54 and the other components. Although the computing device 54 is referenced in the singular, in alternative embodiments the configuration and functionality described herein can be split across multiple devices using techniques known to a person of ordinary skill in the art.

The computing device 54 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 64 may include any non-transitory/tangible medium which participates in providing data or computer-readable instructions. The memory 64 may be non-volatile or volatile. Non-volatile media may include, for example, optical or magnetic disks and other persistent memory. Example volatile media may include dynamic random access memory (DRAM), which may constitute a main memory. Other examples of embodiments for memory 64 include a floppy, flexible disk, or hard disk, magnetic tape or other magnetic medium, a CD-ROM, DVD, and/or any other optical medium, as well as other possible memory devices such as flash memory.

The computing device 54 includes the tangible, non-transitory memory 64 on which are recorded computer-executable instructions, including a bale identification algorithm 66. The processor 62 of the computing device 54 is configured for executing the bale identification algorithm 66. The bale identification algorithm 66 implements a method of identifying a bale 26, 28 of material, described in detail below.

Figure 3:
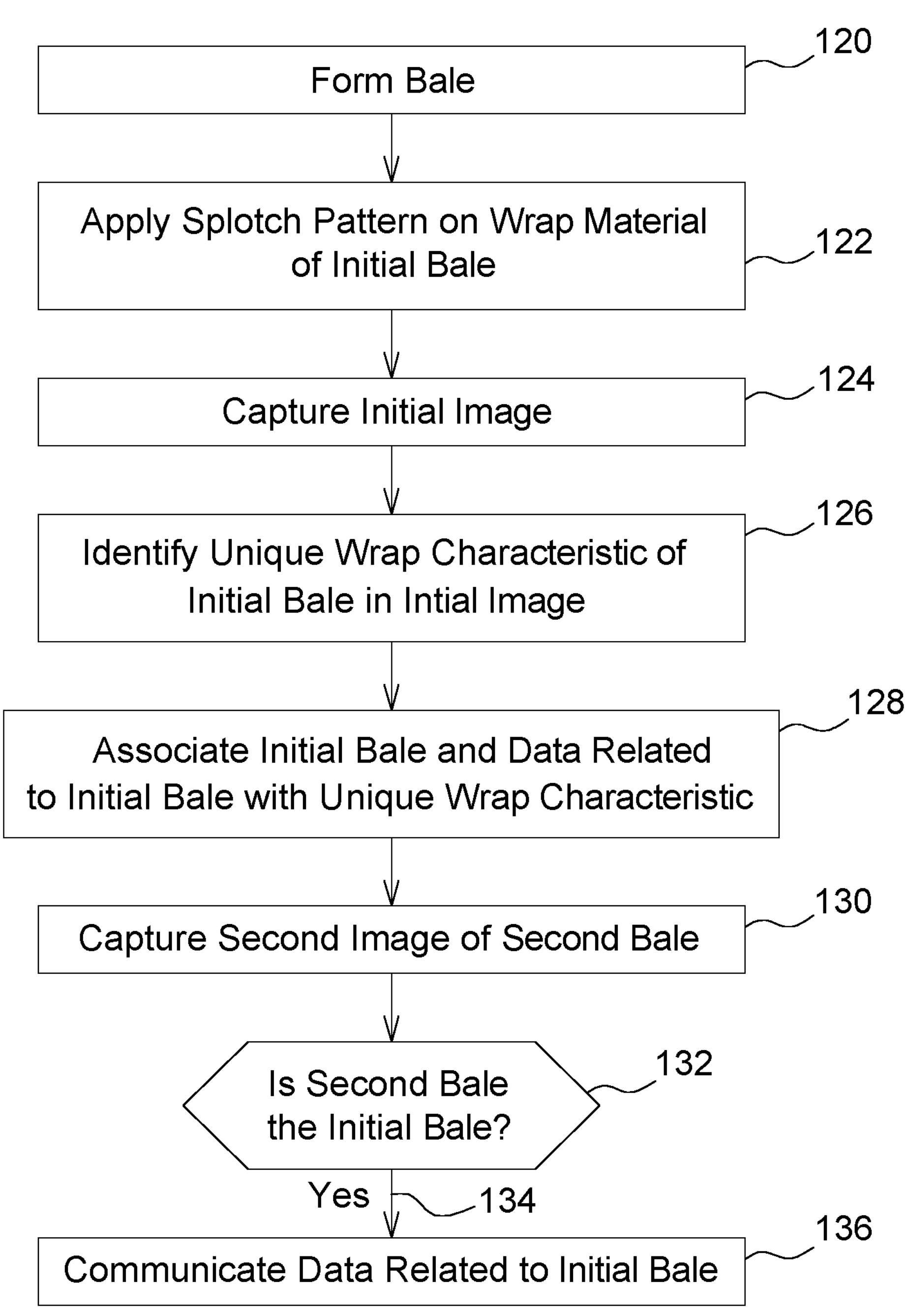
FIG. 3 is a flowchart representing a process of identifying the bale.

Referring to FIG. 3, the method of identifying the bale 26, 28 includes forming the initial bale 26 within the bale formation system 24 of the baler implement 22. The step of forming the initial bale 26 is generally indicated by box 120 in FIG. 3. The specific manner in which the initial bale 26 is formed is not pertinent to the teachings of this disclosure. However, example implementations of the bale formation system 24 are described above.

After the initial bale 26 is formed, the initial bale 26 is secured in the shape of the bale 26, 28 with the wrap material 32. For example, when the baler implement 22 is configured as the round baler, the wrap system 30 may feed an end of the wrap material 32 into the baling chamber, whereby rotation of the bale 26, 28 within the baling chamber draws the wrap material 32 into the baling chamber and around the initial bale 26. The initial bale 26 may be wrapped several times with the wrap material 32 to form several layers of wrap material 32 around the circumference of the initial bale 26.

During formation of the initial bale 26, the marking applicator 36 may apply the marking material 38 onto the wrap material 32 to define the region 40 of the initial bale 26. The marking material 38 indicating the specific region 40 of the initial bale 26 within which the unique wrap characteristic 42 may be detected. It should be appreciated that in some implementations, the region 40 of the initial bale 26 may not be specifically identified and/or delineated.

The marking applicator 36 may further apply the marking material 38 onto the wrap material 32 of the initial bale 26 to form the unique wrap characteristic 42, e.g., the unique splotch pattern 44. The step of applying the splotch pattern 44 onto the wrap material 32 within the region 40 on the initial bale 26 is generally indicated by box 122 in FIG. 3. As described above, the marking applicator 36 may apply the marking material 32 in a manner that generates a random shape having at least the minimum height dimension 46 and the minimum width dimension 48.

A trigger may indicate when formation of the initial bale 26 is complete. The trigger may actuate or signal to the computing device 54 to actuate the initial image sensor 52 to capture the initial image 68. The trigger may include a component or feature of the baler implement 22 that is actuated or engaged at or near the end of formation of the initial bale 26, or at the beginning of formation of a subsequent bale 26, 28. Using the trigger as a signal to actuate the initial image sensor 52 ensures that the initial image 68 is captured at the appropriate time or stage of the bale 26, 28 formation sequence. For example, the trigger may include, but is not limited to, disengagement of the wrap system 30, opening of the rear gate, ejection of the initial bale 26, etc. The trigger may be disposed in communication with the computing device 54 to communicate a signal to the computing device 54, or may otherwise include a sensor to sense actuation of the trigger, with the sensor communicating the signal to the computing device 54. Upon receiving the signal from the trigger, the computing device 54 may actuate the initial image sensor 52 to capture the initial image 68.

The initial image 68 of the region 40 of the initial bale 26 is then captured with the initial image sensor 52. The step of capturing the initial image 68 is generally indicated by box 124 in FIG. 3. The initial image 68 is communicated to the computing device 54. In the example implementation described herein, the computing device 54 is connected to the initial image sensor 52 through the Cloud 72 or other wireless network connection. As such, the initial image sensor 52 communicates the initial image 68 through the Cloud 72 to the computing device 54. However, it should be appreciated that the initial image 68 may be communicated to the computing device 54 using some other network or system capable of communicating data.

The computing device 54 then analyzes the initial image 68 to identify at least one unique wrap characteristic 42 of the wrap material 32 of the initial bale 26 in the initial image 68. The step of identifying the unique wrap characteristic 42 is generally indicated by box 126 in FIG. 3. As described above, the unique wrap characteristic 42 may include, but is not limited to, a unique splotch pattern 44 on the wrap material 32, a unique texture of the wrap material 32, or some other random feature or characteristic of the wrap material 32 that is unique to that specific bale 26, 28. The computing device 54 may use object recognition software, neural networks, artificial intelligence, or other similar image analysis tools known to those skilled in the art to identify the unique wrap characteristic 42.

Once the computer device has identified the unique wrap characteristic 42 of the wrap material 32 on the initial bale 26 from the initial image 68, the unique wrap characteristic 42 is associated with the initial bale 26. The initial image 68 and the associated unique wrap characteristic 42 may then be saved in the memory 64 of the computing device 54, such that the identified unique wrap characteristic 42 of the wrap material 32 on the initial bale 26 is used as an identifier of the initial bale 26.

Data related to the initial bale 26 is also associated with the identified unique wrap characteristic 42 and/or the initial bale 26, and saved in the memory 64 of the computing device 54. the step of associating the initial bale 26 and the data related to the initial bale 26 with the unique wrap characteristic 42 is generally indicated by box 128 in FIG. 3. The data may be communicated to the computing device 54 with the initial image 68 of the initial bale 26. The data may be detected, sensed, calculated, or otherwise determined by the baler implement 22, an associated vehicle such as but not limited to a tractor, or by some other device disposed in communication with the baler implement 22. The data associated with the initial bale 26 may include, but is not limited to, nutrient content, field location, crop/material type, area of field from which the crop material was harvested, date of bale 26, 28 formation, bale 26, 28 weight, moisture content, ash content, etc.

A second image 70 of a second region 74 of the second bale 28 may be captured with the second image sensor 56. The step of capturing the second image 70 is generally indicated by box 130 in FIG. 3. The second bale 28 may include indicia indicating or delineating the second region 74 of the second bale 28, such that the second region 74 may be identified. The second image 70 is communicated to the computing device 54. In the example implementation described herein, the computing device 54 is connected to the second image sensor 56 through the Cloud 72 or other wireless network connection. As such, the second image sensor 56 communicates the second image 70 through the Cloud 72 to the computing device 54. However, it should be appreciated that the second image sensor 56 may communicate the second image 70 to the computing device 54 in some other manner using some other network or communications capacity.

The computing device 54 may then compare the second image 70 of the second bale 28 to the unique wrap characteristic 42 identified in the initial image 68 of the initial bale 26. The computing device 54 makes this comparison to determine if the second image 70 of the second bale 28 includes the unique wrap characteristic 42 identified in the initial image 68, or if the second image 70 of the second bale 28 does not include the unique wrap characteristic 42 identified in the initial image 68. The step of determining if the second bale 28 is the same as the initial bale 26 is generally indicated by box 132 in FIG. 3. When the unique wrap characteristic 42 of the initial bale 26 is identified in the second image 70 of the second bale 28, the computing device 54 may determine that the second bale 28 from the second image 70 is the initial bale 26 from the initial image 68, generally indicated at 134 In FIG. 3. In other words, the computing device 54 uses the unique wrap characteristic 42 associated with the initial bale 26 to identify the second bale 28 as the initial bale 26 at a later time. Assuming that the second bale 28 is in fact the initial bale 26, the indicia indicates the region 40 of the bale 26, 28 from which the initial image 68 was captured. By so doing, the second image 70 may capture the same region 40 of the second bale 28, thereby ensuring that the unique wrap characteristic 42 identified in the initial image 68 will be present in the second image 70.

In contrast, when the unique wrap characteristic 42 is not identified in the second image 70 of the second bale 28, the computing device 54 may determine that the second bale 28 from the second image 70 is not the initial bale 26 from the initial image 68. Assuming that multiple bale 26, 28*s* have been previously identified and associated with respective unique wrap characteristic 42*s*, the computing device 54 may compare the second image 70 to each of the images associated with other bale 26, 28*s* in order to determine if the second image 70 includes the unique wrap characteristic 42 of one of the other previously catalogued bales.

When the computing device 54 determines that the second bale 28 is the initial bale 26, i.e., that the second image 70 included the unique wrap characteristic 42 identified in the initial image 68 and associated with the initial bale 26, then the computing device 54 may communicate the data related to and associated with the initial bale 26 to the output 60. The step of communicating the data related to the initial bale 26 is generally indicated by box 136 in FIG. 3. In practice, an operator may capture the second image 70 of the second bale 28 using the second image sensor 56, e.g., the operator's smart phone. If the computing device 54 determines that the second image 70 includes the unique wrap characteristic 42 of the initial bale 26, and determines that the second bale 28 is the initial bale 26, then the computing device 54 may communicate the data related to the initial bale 26 to the output 60, e.g., the operator's smart phone. The operator may then make decisions related to the use, transport, placement of that respective bale 26, 28 knowing the pertinent data related to it.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A bale identification system comprising:

a marking applicator operable to apply a marking material onto a wrap material to form a random splotch pattern on the wrap material, wherein the wrap material is a sheet material, and wherein the random splotch pattern is a randomly created pattern applied onto the wrap material and defining an irregular shape thereby forming a unique wrap characteristic;

an initial image sensor operable to capture an initial image of an initial bale bound with the wrap material;

a computing device in communication with the initial image sensor and operable to receive the initial image from the initial image sensor, wherein the computing device includes a processor and a memory having a bale identification algorithm stored thereon, wherein the processor is operable to execute the bale identification algorithm to:

analyze the initial image to identify the unique wrap characteristic on the wrap material of the initial bale in the initial image;

associate the unique wrap characteristic identified from the wrap material with the initial bale;

save the initial image and the associated unique wrap characteristic in the memory of the computing device, such that the identified unique wrap characteristic of the initial bale is used as an identifier of the initial bale;

a second image sensor operable to capture a second image of a second bale, wherein the second image sensor is disposed in communication with the computing device for communicating the second image to the computing device;

compare the second image of the second bale to the unique wrap characteristic identified in the initial image of the initial bale to determine if the second image of the second bale includes the unique wrap characteristic identified in the initial image; and determine that the second bale from the second image is the initial bale from the initial image when the unique wrap characteristic is identified in the second image of the second bale.

2. The bale identification system set forth in claim 1, wherein the random splotch pattern includes a two-dimensional pattern.

3. The bale identification system set forth in claim 1, wherein the random splotch pattern includes a three-dimensional pattern.

4. The bale identification system set forth in claim 1, wherein the processor is operable to execute the bale identification algorithm to associate data related to the initial bale with the identified unique wrap characteristic of the initial bale.

5. The bale identification system set forth in claim 1, wherein the second image sensor includes a handheld device.

6. The bale identification system set forth in claim 1, further comprising an output disposed in communication with the computing device and operable to receive a signal from the computing device, wherein the processor is operable to execute the bale identification algorithm to communicate data related to the initial bale associated with the unique wrap characteristic to the output when the unique wrap characteristic is identified in the second image of the second bale.

7. A baling system for baling crop material, the baling system comprising:

a baler implement including a bale formation system for forming collected crop material into an initial bale, a wrap system operable to wrap the initial bale with a wrap material, a marker applicator operable to apply a marking material onto the wrap material, and an initial image sensor positioned to capture an initial image of a region of the initial bale;

wherein the wrap material is a sheet material, wherein the marking applicator is operable to apply the marking material onto the wrap material after the initial bale is formed to create a random splotch pattern on the wrap material, wherein the random splotch pattern is a randomly created pattern applied onto the wrap material and defining an irregular shape thereby forming a unique wrap characteristic;

a computing device disposed in communication with the initial image sensor and operable to receive the initial image of the region of the initial bale, wherein the computing device includes a processor and a memory having a bale identification algorithm stored thereon, wherein the processor is operable to execute the bale identification algorithm to:

analyze the initial image to identify the unique wrap characteristic on the wrap material of the initial bale in the initial image;

associate the unique wrap characteristic identified from the wrap material with the initial bale;

save the initial image and the associated unique wrap characteristic in the memory of the computing device, such that the identified unique wrap characteristic of the initial bale is used as an identifier of the initial bale;

associate data related to the initial bale with the identified unique wrap characteristic on the wrap material of the initial bale; and save the data associated with the initial bale in the memory of the computing device.

8. The baling system set forth in claim 7, wherein the processor is operable to execute the bale identification algorithm to receive a second image of a second bale captured by a second image sensor and compare the second image of the second bale to the unique wrap characteristic of the wrap material on the initial bale to determine if the second image of the second bale includes the unique wrap characteristic identified in the initial image, or if the second image of the second bale does not include the unique wrap characteristic identified in the initial image.

9. The baling system set forth in claim 8, wherein the processor is operable to execute the bale identification algorithm to determine that the second bale from the second image is the initial bale from the initial image when the unique wrap characteristic is identified in the second image of the second bale.

10. The baling system set forth in claim 9, wherein the processor is operable to execute the bale identification algorithm to communicate the data associated with the initial bale to an output when the unique wrap characteristic is identified in the second image of the second bale.

11. The baling system set forth in claim 7, wherein the marking applicator is operable to apply the marking material onto the wrap material to form a three-dimensional splotch pattern.

* * * * *